United States Patent
Chishima et al.

(10) Patent No.: US 8,602,010 B2
(45) Date of Patent: Dec. 10, 2013

(54) FUEL SUPPLY SYSTEM

(75) Inventors: Hiroshi Chishima, Saitama (JP);
Hirotsugu Kudo, Saitama (JP);
Masayoshi Kawaguchi, Saitama (JP);
Kenji Shigetoyo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/570,408

(22) Filed: Aug. 9, 2012

(65) Prior Publication Data

US 2013/0036990 A1 Feb. 14, 2013

(30) Foreign Application Priority Data

Aug. 11, 2011 (JP) .................. 2011-176396
Aug. 11, 2011 (JP) .................. 2011-176397

(51) Int. Cl.
*F02B 13/00* (2006.01)
(52) U.S. Cl.
USPC .......................................... 123/575
(58) Field of Classification Search
USPC ................ 123/1 A, 304, 543–549, 557, 575
See application file for complete search history.

(56) References Cited

U.S. PATENT DOCUMENTS

| | | | | |
|---|---|---|---|---|
| 3,021,681 | A | * | 2/1962 | Perry .................................. 62/7 |
| 4,220,120 | A | * | 9/1980 | Jackson et al. .................... 123/3 |
| 4,836,173 | A | * | 6/1989 | Stires, Jr. ...................... 123/522 |
| 6,067,969 | A | * | 5/2000 | Kemmler et al. ............. 123/548 |
| 6,622,664 | B2 | * | 9/2003 | Holder et al. ...................... 123/3 |
| 8,333,171 | B2 | * | 12/2012 | Lund ............................. 123/1 A |
| 2002/0152999 | A1 | * | 10/2002 | Holder et al. ................. 123/575 |

FOREIGN PATENT DOCUMENTS

| | | |
|---|---|---|
| JP | 2007-278298 A | 10/2007 |
| JP | 2009-144720 A | 7/2009 |
| JP | 2009-203909 A | 9/2009 |

* cited by examiner

*Primary Examiner* — Hung Q Nguyen
(74) *Attorney, Agent, or Firm* — Squire Sanders (US) LLP (57) ABSTRACT

A system for supplying fuel to an internal combustion engine, while improving the utilization rate of an evaporation fuel, is provided. The raw fuel F0 is separated to a first fuel F1 and a second fuel F2 by a separation device 20. The evaporation fuel V derived from the first fuel F1 is suctioned from a condenser 30 by an operation of a vacuum pump 36, and then supplied to a first fuel tank 40. During this operation, at least a part of the evaporation fuel V transits its phase from a gas phase to a liquid phase and stored in the first fuel tank 40 as the first fuel F1.

16 Claims, 8 Drawing Sheets

FUEL SUPPLY SYSTEM

TECHNICAL FIELD

The present invention relates to a technology of supplying fuel to an internal combustion engine.

BACKGROUND ART

Conventionally, there is known a method to selectively provide each of a high-octane number fuel and a low-octane number fuel separated from a raw fuel to an internal combustion engine (Japanese Patent Laid-open No. 2007-278298, hereinafter referred to as Patent Document 1, and Japanese Patent Laid-open No 2009-144720, hereinafter, referred to as Patent Document 2). There is also known a method to prevent air from entering into a tank for storing the high-octane number fuel resulting from the fact that a volatility of the high-octane number fuel is lower compared to that of the raw fuel (Japanese Patent Laid-open No. 2009-203909, hereinafter referred to as Patent Document 3). Specifically, the device is configured to supply an evaporation fuel from a raw fuel tank to the high-octane number fuel tank, and further to a charcoal canister from the high-octane number fuel tank.

DISCLOSURE OF THE INVENTION

Problems to be Solved by the Invention

However, although a large amount of evaporation fuel can be effectively used for the operation of the internal combustion engine as the adsorption capacity of the canister becomes larger, the capacity is limited due to limitations of space for mounting the canister in the vehicle. Therefore, in a case where a large amount of evaporation fuel is generated, the evaporation fuel which is unable to be adsorbed by the canister will be discharged outside the vehicle and be wasted.

Therefore, the present invention aims to provide a system enabling to supply fuel to the internal combustion engine while improving the utilization rate of the evaporation fuel.

Means for Solving the Problem

The present invention relates to a fuel supply system configured to supply a first fuel which is separated from a raw fuel and containing components with high-octane number more than the raw fuel, and a second fuel which is separated from the raw fuel and containing components with low-octane number more than the raw fuel or the raw fuel, selectively or by a specified mixing ratio to an internal combustion engine at the same time.

The fuel supply system according to the present invention comprises: a raw fuel tank configured to store the raw fuel; a separation device configured to separate the raw fuel supplied from the raw fuel tank to the first fuel and the second fuel; a condenser configured to condense the first fuel separated by the separation device; a first fuel tank configured to store the first fuel condensed by the condenser; a vacuum pump configured to suction an evaporation fuel generated by an evaporation of the first fuel from the condenser, and then to provide it to the first fuel tank; and a controller configured to control an operation of the vacuum pump.

According to the fuel supply system of the present invention, the raw fuel is separated into the first fuel (high-octane number fuel) and the second fuel (low-octane number fuel) by the separation device. The first fuel is supplied to the condenser from the separation device in a gas phase state (in a form of evaporation fuel), and at least a part of it is liquefied to a liquid phase by being condensed at the condenser.

Furthermore, the evaporation fuel derived from the first fuel is suctioned from the condenser by the operation of the vacuum pump, and then supplied to the first fuel tank. According to this, at least a part of the evaporation fuel transits its phase from the gas phase to the liquid phase and can be stored in the first fuel tank as the first fuel. Accordingly, on an occasion of depressurization of the condenser, the evaporation fuel is prevented from being discharged outside the vehicle or the like in a non-recoverable and non-usable form, thereby improving the utilization rate of the evaporation fuel.

The fuel supply system according to the present invention is preferably configured to supply the evaporation fuel from the first fuel tank to the condenser.

According to the fuel supply system having this configuration, by supplying the evaporation fuel from the first fuel tank to the condenser, the pressure of the condenser is raised, and enables to supply the first fuel to the first fuel tank from the condenser through a secondary collecting path. Therefore, the pressure of the condenser can be raised without leaking the evaporation fuel outside in a non-recoverable and non-usable form from the condenser and the first fuel tank or the like. As a result, the evaporation fuel discharged in a non-recoverable form without being supplied to the internal combustion engine is reduced and the utilization rate thereof is improved.

The fuel supply system according to the present invention further comprises a first opening-closing mechanism configured to open and close a first collecting path for supplying the first fuel separated by the separation device to the condenser, a second opening-closing mechanism configured to open and close a secondary collecting path for supplying the first fuel which is condensed by the condenser and in a liquid phase state to the first fuel tank, a third opening-closing mechanism configured to open and close a first evaporation fuel path for supplying the evaporation fuel to the condenser from the first fuel tank, and a fourth opening-closing mechanism configured to open and close a second evaporation fuel path for supplying the evaporation fuel to the first fuel tank from the condenser and which is provided with the vacuum pump, wherein it is preferable that the controller controls an operation of the first opening-closing mechanism, the second opening-closing mechanism, the third opening-closing mechanism, and the fourth opening-closing mechanism so as to realize in order a first state in which the first opening-closing mechanism is opened while the second opening-closing mechanism, the third opening-closing mechanism, and the fourth opening-closing mechanism are closed, a second state in which the second opening-closing mechanism and the third opening-closing mechanism are opened while the first opening-closing mechanism and the fourth opening-closing mechanism are closed, and a third state in which the fourth opening-closing mechanism is opened while the first opening-closing mechanism, the second opening-closing mechanism, and the third opening-closing mechanism are closed, and the controller controls the operation of the vacuum pump so as to operate the vacuum pump in the third state and to stop the operation of the vacuum pump in the first state and the second state.

According to the fuel supply system having the above features, on the occasion of pressurization and depressurization of the condenser, the evaporation fuel is prevented from leaking in a non-recoverable and non-usable form from the condenser and the first fuel tank or the like, thereby improving the utilization rate of the evaporation fuel.

The fuel supply system according to the present invention further comprises a pressure sensor configured to measure an internal atmospheric pressure of the condenser, wherein it is preferable that the controller is configured to control the operation of the first opening-closing mechanism, the second opening-closing mechanism, the third opening-closing mechanism, and the fourth opening-closing mechanism so as to realize a transition from the third state to the first state on a condition that the internal atmospheric pressure of the condenser represented by an output signal of the pressure sensor decreases to be equal to or lower than a first negative pressure, while so as to realize a transition from the first state to the second state on a condition that the internal atmospheric pressure of the condenser represented by the output signal of the pressure sensor increases to be equal to or higher than a second negative pressure which is higher than the first negative pressure.

According to the fuel supply system of this configuration, the opening and closing of each opening-closing mechanism and the operation of the vacuum pump are controlled according to the pressure of the condenser measured by using the pressure sensor. According to this, an operation period and operation stop period of the vacuum pump can be appropriately controlled from the view point of facilitating the separation of the first fuel and the second fuel by the separation device, while avoiding unnecessary discharge of the evaporation fuel.

The fuel supply system according to the present invention further comprises a fifth opening-closing mechanism configured to open and close a path for supplying the evaporation fuel to the internal combustion engine from the first fuel tank, wherein it is preferable that the controller is configured to control an operation of the fifth opening-closing mechanism so as to realize a fourth state in which the fifth opening-closing mechanism is opened.

According to the fuel supply system of this configuration, the evaporation fuel filling the first fuel tank is supplied to the internal combustion engine directly or indirectly, thereby improving the utilization efficiency of the evaporation fuel.

The fuel supply system according to the present invention further comprises a pressure sensor configured to measure an internal atmospheric pressure of the first fuel tank, wherein it is preferable that the controller is configured to control the operation of the fifth opening-closing mechanism so as to realize the fourth state on a condition that the internal atmospheric pressure of the first fuel tank represented by an output signal of the pressure sensor increases to be equal to or higher than a threshold value.

According to the fuel supply system of this configuration, the opening and closing of the fifth opening-closing mechanism is controlled according to a pressure of the first fuel tank measured by using the pressure sensor. According to this, a supply timing or period of the evaporation fuel to the internal combustion engine is appropriately controlled from the view point of effectively utilizing the evaporation fuel filling the first fuel tank.

The fuel supply system according to the present invention further comprises a canister configured to adsorb the evaporation fuel generated by the evaporation of the first fuel, and to desorb the evaporation fuel so as to supply it to the internal combustion engine, wherein it is preferable that the controller is configured to suction the evaporation fuel from the condenser and to supply the suctioned evaporation fuel to the canister.

According to the fuel supply system of this configuration, the evaporation fuel derived from the first fuel is suctioned from the condenser by the operation of the vacuum pump, and then is supplied to the canister, and adsorbed to the canister (to be precise, to the adsorbent embedded therein). The evaporation fuel is desorbed from the canister and can be provided to the internal combustion engine.

Here, since the operation of the vacuum pump is controlled so as to repeat an intermittent operation, unlike in a case where the vacuum pump is operated constantly or continuously, the situation in which a supply amount of the evaporation fuel to the canister becomes excess can be avoided or restrained. As a result, the evaporation fuel discharged outside the vehicle or the like from the canister in a non-recoverable form without being supplied to the internal combustion engine is reduced, and thereby the utilization rate thereof can be improved.

The fuel supply system according to the present invention further comprises a plurality of opening-closing mechanisms configured to open and close between the condenser and the outside, wherein it is preferable that the controller is configured to control the operation of each of the plurality of opening-closing mechanisms so as to realize alternately a closed state in which the condenser is intercepted from the outside and an opened state in which the condenser communicates to the outside, and to control the operation of the vacuum pump so as to operate the vacuum pump in the closed state of the condenser, and to stop the operation of the vacuum pump in the opened state of the condenser.

According to the fuel supply system of this configuration, by operating the vacuum pump in the closed state of the condenser, the condenser is decompressed and the evaporation fuel derived from the first fuel is supplied to the canister. On the other hand, in the opened state of the condenser, the raw fuel is separated into the first fuel and the second fuel by the separation device, or the first fuel is supplied to the first fuel tank from the condenser.

In the opened state of the condenser, by stopping the operation of the vacuum pump, the situation in which the evaporation fuel derived from the first fuel is excessively supplied to the canister can be avoided. As a result, the evaporation fuel which is discharged outside the vehicle from the canister in a non-recoverable form without being supplied to the internal combustion engine is reduced, thereby improving the utilization rate thereof.

The fuel supply system according to the present invention further comprises, a first opening-closing mechanism configured to open and close a first collecting path for supplying the first fuel from the separation device to the condenser, a second opening-closing mechanism configured to open and close a secondary collecting path for supplying the first fuel from the condenser to the first fuel tank, a third opening-closing mechanism configured to open and close a path for supplying air to the condenser from outside, wherein it is preferable that the controller is configured to control an operation of the first opening-closing mechanism, the second opening-closing mechanism, and the third opening-closing mechanism so as to realize in order a first state as the closed state of the condenser in which the first opening-closing mechanism, the second opening-closing mechanism, and the third opening-closing mechanism are closed, a second state as the opened state of the condenser in which the first opening-closing mechanism is opened while the second opening-closing mechanism and the third opening-closing mechanism are closed, and a third state as the opened state of the condenser in which the first opening-closing mechanism is closed while the second opening-closing mechanism and the third opening-closing mechanism are opened.

According to the fuel supply system of this configuration, in the first state, the condenser is depressurized to a negative pressure state by the operation of the vacuum pump and the evaporation fuel derived from the first fuel is supplied to the canister. Subsequently, in the second state, the raw fuel is separated into the first fuel and the second fuel by the separation device. Furthermore, in the third state, the first fuel is supplied to the first fuel tank from the condenser.

In each of the second state and the third state, the operation of the vacuum pump is stopped. By this, the situation in which the evaporation fuel derived from the first fuel is excessively supplied to the canister can be avoided. As a result, the evaporation fuel discharged outside the vehicle from the canister in a non-recoverable form without being supplied to the internal combustion engine is reduced, thereby improving the utilization rate thereof.

The fuel supply system according to the present invention is preferably configured to supply the evaporation fuel to the condenser from the canister through the third opening-closing mechanism in the opened state.

According to the fuel supply system of this configuration, among the evaporation fuel derived from the first fuel occluded by the canister, at least a part of it is supplied to the condenser and supplied to the first fuel tank after condensation. By this, on an occasion when the third opening-closing mechanism transits from the closed state to the opened state, the situation in which the evaporation fuel existing in the condenser is discharged to outside of the vehicle or the like in a non-recoverable form and wasted, is avoided. Moreover, the utilization rate of the evaporation fuel supplied to the canister from the first fuel tank is improved.

The fuel supply system according to the present invention is preferably configured to supply the evaporation fuel to the canister from the first fuel tank.

According to the fuel supply system of this configuration, the evaporation fuel derived from the first fuel filling the first fuel tank is supplied to the canister, and then supplied to the internal combustion engine. Therefore, the utilization rate of the evaporation fuel is improved.

The fuel supply system according to the present invention further comprises a pressure sensor configured to measure an internal atmospheric pressure of the condenser, wherein it is preferable that the controller is configured to control the operation of the first opening-closing mechanism, the second opening-closing mechanism, and the third opening-closing mechanism, so as to realize a transition from the first state to the second state on a condition that the internal atmospheric pressure of the condenser represented by an output signal of the pressure sensor decreases to be equal to or lower than a first negative pressure, while so as to realize a transition from the second state to the third state on a condition that the internal atmospheric pressure of the condenser represented by the output signal of the pressure sensor increases to be equal to or higher than a second negative pressure which is higher than the first negative pressure.

According to the fuel supply system of this configuration, the opening and closing of each opening-closing mechanism and the operation of the vacuum pump are controlled according to the pressure of the condenser measured by using the pressure sensor. According to this, an operation period of the vacuum pump can be appropriately controlled from the view point of facilitating the separation of the first fuel and the second fuel by the separation device, while avoiding waste of the evaporation fuel.

The fuel supply system according to the present invention is preferably configured to supply the evaporation fuel desorbed from the canister to the separation device.

According to the fuel supply system of this configuration, the evaporation fuel discharged to outside of the vehicle from the canister without being supplied to the internal combustion engine is reduced, thereby improving the utilization rate thereof.

The fuel supply system according to the present invention is preferably configured to heat the canister by a condensation heat of the first fuel generated at the condenser.

According to the fuel supply system of this configuration, by the heating of the canister, the desorption of the evaporation fuel from the canister is prompted and it can be supplied to the internal combustion engine. Therefore, it is possible to improve the utilization rate of the evaporation fuel is improved.

MODE FOR CARRYING OUT THE INVENTION

First Embodiment

Configuration

Figure 1:
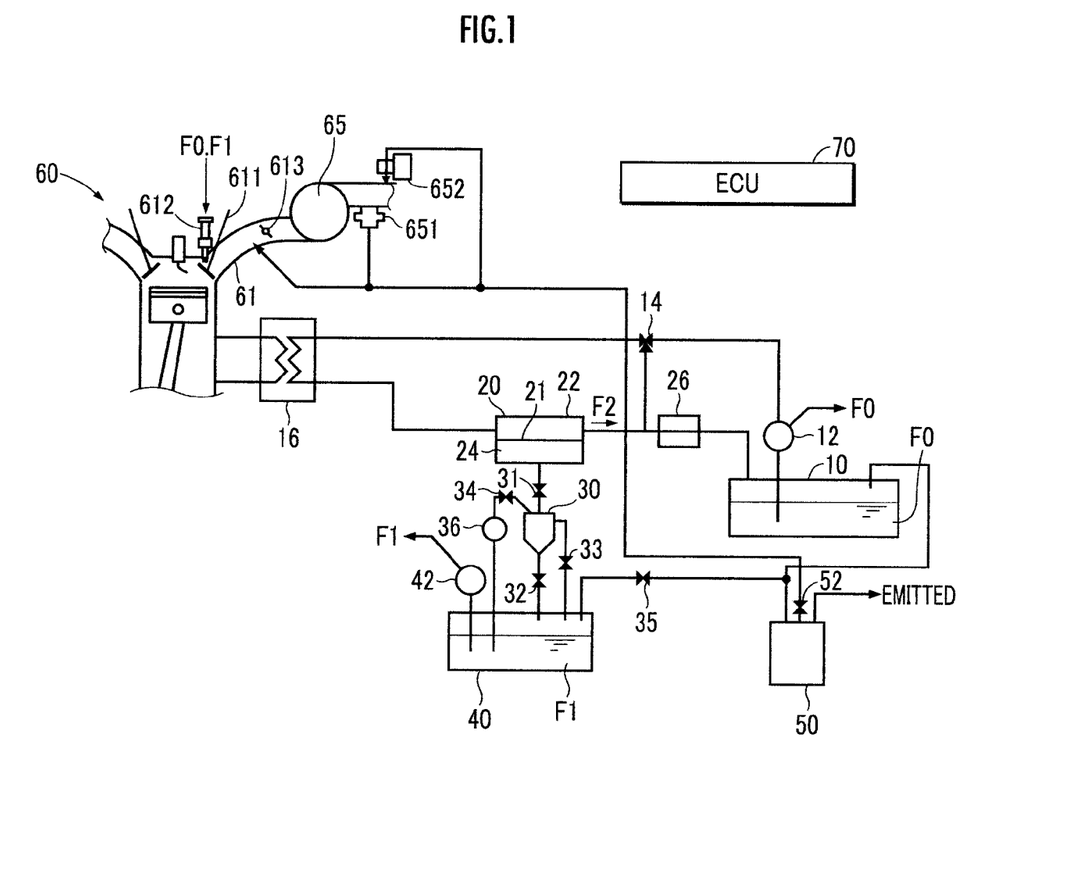
FIG. 1 An explanatory view showing features of a fuel supply system according to a first embodiment of the present invention.

The fuel supply system as the first embodiment of the present invention shown in FIG. 1 comprises a raw fuel tank 10, a separation device 20, a first fuel tank 40, a condenser 30, a canister 50, and an ECU (electronic control unit (controller)) 70. The fuel supply system is installed in the vehicle and is configured to supply fuel to an internal combustion engine 60 which is also installed in the vehicle.

Normal or commercial gasoline provided through a fuel filler is stored as raw fuel F0 in the raw fuel tank 10. The raw fuel F0 stored in the raw fuel tank 10 is supplied to the internal combustion engine 60 after its pressure is raised to a designated pressure by a high pressure supply pump 12.

Furthermore, the raw fuel F0 is sent to the separation device 20 after its pressure being raised to a designated pressure by the high pressure supply pump 12, and then being heated by a heater 16. In a case where the raw fuel tank 10 and the heater 16 are intercepted by a three-way valve 14, the raw fuel F0 is returned to the raw fuel tank 10 through a radiator 26, without passing through the separation device 20. The heater 16 is composed of a heat exchanger which exchanges heat of a coolant water of the internal combustion engine 60 and the raw fuel. As an alternative, or in addition to the heat exchanger, the heater 16 can be configured by an electric heater.

By the evaporation of the raw fuel F0 stored in the raw fuel tank 10, evaporation fuel V containing hydrocarbon and ethanol is generated. The evaporation fuel V is supplied to the canister 50 from the raw fuel tank 10.

The separation device 20 is configured to separate the raw fuel F0 into a first fuel F1 and a second fuel F2 according to penetrative vaporization (PV (pervaporation)). The separation device 20 comprises a separation membrane 21 which selectively permeates high-octane number component in the raw fuel (gasoline), and a high pressure chamber 22 and a low pressure chamber 24 sectioned by the separation membrane 21.

The first fuel F1 is a high-octane number fuel, for example, alcohol such as ethanol or the like, having more content amount of high-octane number component compared to the raw fuel F0. The second fuel F2 is a low-octane number fuel having less content amount of high-octane number component compared to the raw fuel F0.

In particular, raw fuel F0 in a high temperature and high pressure state is supplied to the high pressure chamber 22 of the separation device 20, while by maintaining the low pressure chamber 24 in a negative pressure state, the high-octane number component contained in the raw fuel F0 permeates the separation membrane 21 and effuses to the low pressure chamber 24. When an amount of high-octane number component in the raw fuel F0 increase, since the octane number of the permeating liquid becomes higher, the first fuel F1 containing much high octane number component and having a higher octane number compared to the raw fuel F0 is collected from the low pressure side of the separation membrane 21.

On the other hand, since the amount of high-octane number component contained in the raw fuel F0 flowing through the high pressure chamber 22 decreases as it flows to the down stream, the second fuel F2 containing a small amount of high-octane number component and having a lower octane number compared to the raw fuel F0 remains in the high pressure chamber 22. The second fuel F2 flowing out from the separation device 20 is supplied to the raw fuel tank 10 after being cooled by the radiator 26.

Furthermore, the operating conditions of the separation device 20 such as the temperature of the separation membrane 21, the temperature and the supply amount of the raw fuel F0, and the pressure of the high pressure chamber 22 and the pressure (negative pressure) or the like of the low pressure chamber 24 can be controlled. By this, the separation speed or the collection amount of the first fuel F1 and the second fuel F2 by the separation device 20 changes.

For example, the temperature of the separation membrane 21 can be adjusted by controlling the temperature of the raw fuel F0 supplied to the separation device 20 by the heater 16. Furthermore, the pressure of the low pressure chamber 24 can be adjusted according to the depressurization of the condenser 30 by the operation of the vacuum pump 36.

The second fuel F2 may be provided to a second fuel tank (not shown in the figures) different from the raw fuel tank 10, and then stored in the second fuel tank. Moreover, the second fuel F2 stored in the second fuel tank may be supplied to the internal combustion engine 60 instead of the raw fuel F0.

The condenser (negative pressure tank) 30 is provided on the way of a collecting path connecting the low pressure chamber 24 of the separation device 20 and the first fuel tank 40, and is configured to condense the first fuel F1. The condenser 30 is composed of, for example, an air cooling type or a water cooling type tank or a reservoir.

The condenser 30 is connected to the intake side of the vacuum pump (negative pressure pump) 36. The inside of the condenser 30 is controlled to a negative pressure state by the operation of the vacuum pump 36, and to be in a low pressure state compared to a vapor pressure of the first fuel F1. The evaporation fuel V containing alcohol such as ethanol or the like generated by the evaporation of the first fuel F1 is supplied to the canister 50 or the like by the operation of the vacuum pump 36. The condenser 30 is provided with a pressure sensor (not shown in the figures) for measuring the internal pressure of the condenser.

In the first collecting path connecting the separation device 20 and the condenser 30, a first opening-closing mechanism 31 is provided for opening and closing this path. The low pressure chamber 24 of the separation device 20 and the condenser 30 communicate by opening the first opening-closing mechanism 31. On the other hand, by closing the first opening-closing mechanism 31, the separation device 20 and the condenser 30 is intercepted.

In the secondary collecting path connecting the condenser 30 and the first fuel tank 40, a second opening-closing mechanism 32 is provided for opening and closing this path. The condenser 30 and the first fuel tank 40 communicate by opening the second opening-closing mechanism 32. On the other hand, by closing the second opening-closing mechanism 32, the condenser 30 and the first fuel tank 40 is intercepted.

The condenser 30 and the first fuel tank 40 are connected by a first evaporation fuel path different from the secondary collecting path, and a third opening-closing mechanism 33 is provided in the first evaporation fuel path. By opening the third opening-closing mechanism 33, the evaporation fuel V filling the first fuel tank 40 is introduced to the condenser 30.

The condenser 30 and the first fuel tank 40 are connected through a second evaporation fuel path different from the first evaporation fuel path, and a fourth opening-closing mechanism 34 and the vacuum pump 36 are provided in the second evaporation fuel path. By opening the fourth opening-closing mechanism 34 and by operating the vacuum pump 36, the evaporation fuel V is introduced from the condenser 30 to the first fuel F1 stored in the first fuel tank 40.

The first fuel F1 separated from the raw fuel F0 by the separation device 20 is stored in the first fuel tank 40. The first fuel F1 stored in the first fuel tank 40 is supplied to the internal combustion engine 60 after having its pressure raised to a designated pressure by the high pressure supply pump 42.

By the evaporation of the first fuel F1 stored in the first fuel tank 40, evaporation fuel V containing alcohol such as ethanol or the like is generated. The first fuel tank 40 and the canister 50 are connected and a fifth opening-closing mechanism 35 is provided in this connecting path. By opening the fifth opening-closing mechanism 35, the evaporation fuel V is supplied to the canister 50 from the first fuel tank 40 through the connecting path.

The first fuel tank 40 is provided with a pressure sensor (not shown in the figures) for measuring the internal pressure thereof.

Each of the opening-closing mechanisms 31 to 35 is configured of, for example, a solenoid valve.

The canister 50 is embedded with adsorbent material such as activated carbon or the like, and not only alcohol contained in the evaporation fuel V derived from the raw fuel F0 but also hydrocarbon are adsorbed by the adsorbent material. By this, the evaporation fuel V can be separated into alcohol and hydrocarbon, and other components such as nitrogen or the like.

The air containing the separated nitrogen or the like is discharged to outside the vehicle from the canister 50. On the other hand, when the internal combustion engine 60 is activated and an intake pipe 61 becomes a negative pressure state, the alcohol and the hydrocarbon adsorbed to the adsorbent material in the canister 50 are supplied to the intake pipe 61 at the downstream side of a throttle valve 613, and further introduced to a combustion chamber, and then combusted. In a discharging path connected to the canister 50, a flow amount adjusting valve 52 for adjusting the flow amount of the evaporation fuel V is provided.

It may be configured that the canister 50 is heated by the condensation heat of the first fuel F1 generated at the condenser 30, and the temperature thereof is maintained within a temperature range which sufficiently exhibit the adsorptive performance of the evaporation fuel V. For example, a flow path of a coolant medium of the condenser 30 may be configured so that the canister 50 is heated by the coolant medium.

The intake pipe 61 connected to the combustion chamber of the internal combustion engine 60 is provided with an intake valve 611, a fuel injection device 612, and the throttle valve 613. By opening the intake valve 611, the intake pipe 61 and the combustion chamber is communicated. On the other hand, by closing the intake valve 611, the intake pipe 61 and the combustion chamber is intercepted. The throttle valve 613 is configured so as to adjust the inhaled air amount of the internal combustion engine 60.

The fuel injection device 612 is arranged between the intake valve 611 and the throttle valve 613 and is configured to inject selectively one of the raw fuel F0 and the first fuel F1 to each cylinder of the internal combustion engine 60. The fuel injection device 612 may also be configured to inject simultaneously both of the raw fuel F0 and the first fuel F1 at a specified mixing ratio to each cylinder of the internal combustion engine 60. A mixed gas of air inhaled to the intake pipe 61 and the fuel injected from the fuel injection device 612 is introduced to the combustion chamber of each cylinder from the intake pipe 61.

In the case the second fuel tank is provided, the fuel injection device 612 may be configured to inject selectively one of the first fuel F1 and the second fuel F2 or inject the both simultaneously at a specified mixing ratio to each of the cylinder of the internal combustion engine 60.

The intake pipe 61 is provided with a turbocharger 65, a venturi gas mixer 651, and a purge pump 652 at the upstream side of the throttle valve 613. The evaporation fuel V is supplied to the intake pipe 61 from the canister 50 through the purge pump 652 and the turbocharger 65.

The internal combustion engine 60 may be a naturally aspirated engine and not an engine with the turbocharger 65. In such a case, the evaporation fuel V may be supplied to the intake pipe 61 from the canister 50 at the downstream side of the throttle valve 613 through a purge control valve (not shown in the figures).

Moreover, the evaporation fuel V may be directly provided to the intake pipe 61 from the condenser 30 by the venturi gas mixer 651. Furthermore, the evaporation fuel V may be directly supplied to the intake pipe 61 of the internal combustion engine 60 from the first fuel tank 40.

The controller 70 is configured of a programmable computer. The controller 70 is input with output signals of various types of sensors for detecting various states of the fuel supply system such as the pressure sensor outputting signals according to the pressure P of the condenser 30. The controller 70 is programmed to perform negative pressure control processing which will be explained later. The controller 70 is programmed to execute arithmetic processing necessary for adjusting operation conditions of the separation device 20, adjusting fuel supplied to the internal combustion engine 60, and operation control of each pump and opening-closing or opening degree adjustment of each valve, as well as for fuel injection control and ignition timing control of the internal combustion engine 60.

"Programmed" means that the arithmetic processing unit such as the CPU or the like which is a component of the computer is configured to read out the software in addition to necessary information from a memory such as a ROM or RAM or the like or a record medium, and executes arithmetic processing with respect to the information according to the software.

(Functions)

The functions of the fuel supply system having the aforementioned configuration will be explained. In particular, the negative pressure control processing according to the steps explained below is repeatedly performed by the controller 70.

Figure 2:
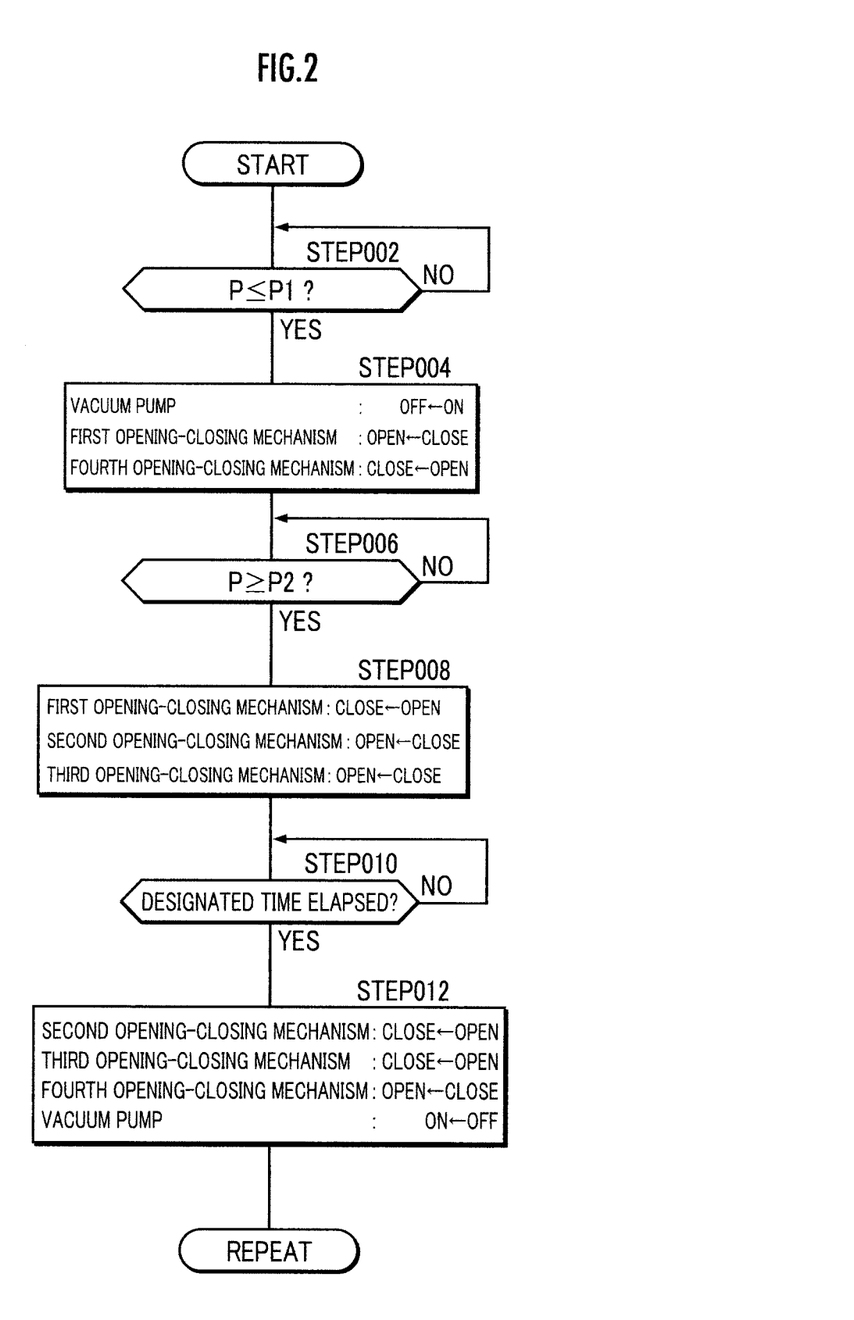
FIG. 2 A flow chart showing the steps of negative pressure control process (first embodiment).

The condenser 30 is depressurized by the operation of the vacuum pump 36 in a third state. The third state means a state in which the fourth opening-closing mechanism 34 is opened while the first opening-closing mechanism 31, the second opening-closing mechanism 32, and the third opening-closing mechanism 33 are closed. In this state, it is determined whether or not pressure P of the condenser 30 has reached to be equal to or less than a first negative pressure P1 (FIG. 2/STEP 002). Negative pressure is defined as a negative value in reference to an atmospheric pressure or an ordinary pressure. That is, the absolute value thereof becomes larger as it is lower in pressure compared to the atmospheric pressure.

In a case where the above determination result is positive (FIG. 2/STEP 002 . . . YES), the first opening-closing mechanism 31 is opened (FIG. 2/STEP 004). By this, the first state in which the first opening-closing mechanism 31 is opened while the second opening-closing mechanism 32, the third opening-closing mechanism 33, and the fourth opening-closing mechanism 34 are closed, is realized. Also, the operation of the vacuum pump 36 is stopped (FIG. 2/STEP 004).

Here, the operation of the vacuum pump 36 may be stopped and the first opening-closing mechanism 31 may be opened after a first designated time has elapsed (refer to FIG. 2/STEP 004) from starting the operation of the vacuum pump 36 which will be described later (refer to FIG. 2/STEP 012).

Figure 3:
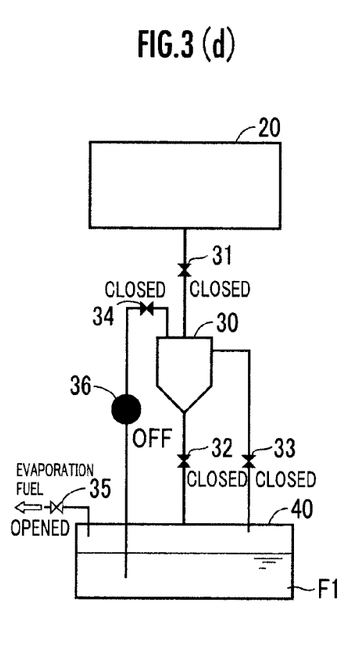
FIG. 3 An explanatory view regarding an opening-closing process of a negative pressure control system (first embodiment).

In the first state, the separation of the first fuel F1 and the second fuel F2 by the separation device 20 is started, and as shown in FIG. 3(a), the first fuel F1 is supplied to the condenser 30 from the separation device 20. At least a part of the first fuel F1 is retained in the condenser 30 which is in a negative pressure and a coolant state, after being condensed (being phase transit from the gas phase to the liquid phase). Moreover, the evaporation fuel V is increased in the condenser 30 by stopping the vacuum pump 36, and the pressure inside the condenser 30 is raised.

It is determined whether or not the pressure P of the condenser 30 has reached to be equal to or higher than a second negative pressure value P2 which is higher than the first negative pressure P1 (FIG. 2/STEP 006). As mentioned before, since the negative pressure is defined as a negative value with reference to the atmospheric pressure, the absolute value of the second negative pressure P2 is smaller than the absolute value of the first negative pressure P1.

In a case where the above determination result is positive (FIG. 2/STEP 006 . . . YES), the first opening-closing mechanism 31 is closed while the second opening-closing mechanism 32 and the third opening-closing mechanism 33 are opened (FIG. 2/STEP 008). By this, the second state in which the first opening-closing mechanism 31 and the fourth opening-closing mechanism 34 are closed while the second opening-closing mechanism 32 and the third opening-closing mechanism 33 are opened, is realized.

Here, the first opening-closing mechanism 31 may be closed while the second opening-closing mechanism 32 and the third opening-closing mechanism 33 are opened after a second designated time has elapsed from stopping the operation of the vacuum pump 36 and opening the first opening-closing mechanism (refer to FIG. 2/STEP 008).

The values of each of the first negative pressure P1 and the second negative pressure P2 may be changed to various values in advance or may be changed by the controller 70 according to the fuel supply system or the travelling condition (acceleration request or the like) of the vehicle mounted with the fuel supply system. For example, the concentration or the containing amount of the first fuel F1 in the raw fuel F0 stored in the raw fuel tank 10 may be measured, and the second negative pressure P2 may be set higher as the measured value is higher.

By closing the first opening-closing mechanism 31, the separation of the first fuel F1 and the second fuel F2 by the separation device 20 is stopped. By opening the second opening-closing mechanism 32, as shown in FIG. 3(b), the first fuel F1 retained in the condenser 30 is supplied to the first fuel tank 40. Moreover, by opening the third opening-closing mechanism 33, as shown in FIG. 3(b), the evaporation fuel V is supplied to the condenser 30 from the first fuel tank 40, and the pressure of the condenser 30 is raised and equals to the pressure of the first fuel tank 40.

It is determined whether or not a designated time (for example, 10 [s]) has elapsed after the second state is realized (FIG. 2/STEP 010).

In a case where this determination result is positive (FIG. 2/STEP 010 . . . YES), both of the second opening-closing mechanism 32 and the third opening-closing mechanism 33 are closed while the fourth opening-closing mechanism 34 is opened (FIG. 2/STEP 012). By this, the third state is realized. Furthermore, the operation of the vacuum pump 36 is started (FIG. 2/STEP 012).

In the third state, as shown in FIG. 3(c), the evaporation fuel V (gas) is supplied to the first fuel tank 40 from the condenser 30 (refer to the arrow), and the pressure P of the condenser 30 decreases. The evaporation fuel V induces bubbling of the first fuel F1 in the first fuel tank 40, and at least a part of the evaporation fuel V in the bubbles can be taken into the first fuel F1 which is in the liquid phase state. In the first fuel tank 40, the first fuel F1 is in a two phase state (gas phase-liquid phase), and by supplying the evaporation fuel V from the condenser 30, the pressure of the first fuel tank 40 is raised. The evaporation fuel V may be also supplied to a space which is filled with the evaporation fuel V in the first fuel tank 40 from the condenser 30.

After this, the process after the determination of comparing the pressure P of the condenser 30 is repeated (refer to FIG. 2/STEP 002).

Moreover, the ECU 70 determines whether or not an opening condition of the first fuel tank 40 is satisfied during the execution of the negative pressure control processing. As the opening condition, a condition that the measured pressure of the first fuel tank 40 becomes equal to or higher than a threshold value, or a condition that an acceleration request of the vehicle exceeding a threshold value being made, or a condition of the combination of these conditions may be adopted.

Then, in a case where it is determined that the opening condition is satisfied, the fourth state is realized in which the fifth opening-closing mechanism 35 is opened. On such occasion, for example, the first opening-closing mechanism 31, the second opening-closing mechanism 32, the third opening-closing mechanism 33, and the fourth opening-closing mechanism 34 are closed. In the fourth state, as shown in FIG. 3(d), the evaporation fuel V is emitted from the first fuel tank 40, and then supplied to the internal combustion engine 60 through the intake pipe 61.

(Effect)

According to the first embodiment of the fuel supply system of the present invention, the raw fuel F0 is separated to the first fuel F1 and the second fuel F2 by the separation device 20 in the first state (the first opening-closing mechanism 31 . . . opened, the second opening-closing mechanism 32 . . . closed, the third opening-closing mechanism 33 . . . closed, the fourth opening-closing mechanism 34 . . . closed) (refer to FIG. 2/STEP 004, FIG. 3(a)). The first fuel F1 is retained in the condenser 30 which is in a negative pressure state, at least a part of it being in a liquid phase state.

Subsequently, the evaporation fuel V is supplied to the condenser 30 from the first fuel tank 40 in the second state (the first opening-closing mechanism 31 . . . closed, the second opening-closing mechanism 32 . . . opened, the third opening-closing mechanism 33 . . . opened, the fourth opening-closing mechanism 34 . . . closed) (refer to FIG. 2/STEP 008, FIG. 3(b)). By this, the inner pressure of the condenser 30 raises and the first fuel F1 in a liquid phase state is supplied to the first fuel tank 40 from the condenser 30 through the secondary collection path.

Then, the vacuum pump 36 is operated in the third state (the first opening-closing mechanism 31 . . . closed, the second opening-closing mechanism 32 . . . closed, the third opening-closing mechanism 33 . . . closed, the fourth opening-closing mechanism 34 . . . opened). By this, the evaporation fuel V derived from the first fuel F1 is supplied to the first fuel tank 40 from the condenser 30 and the condenser 30 is depressurized (refer to FIG. 2/STEP 012, FIG. 3(c)).

As shown above, on occasions of pressurization and depressurization of the condenser 30, since the evaporation fuel V is prevented from leaking outside the vehicle or the like in a non-recoverable and non-usable form from the condenser 30 and the first fuel tank 40, the utilization rate of the evaporation fuel V is improved.

Furthermore, in the fourth state (the fifth opening-closing mechanism 35 . . . opened), the evaporation fuel V filling the first fuel tank 40 is directly supplied to the internal combustion engine 60 (refer to FIG. 3(d)). The evaporation fuel V may be adsorbed and stored in the canister 50, and then supplied indirectly to the internal combustion engine 60. Therefore, the utilization efficiency of the evaporation fuel V is improved.

Figure 4:
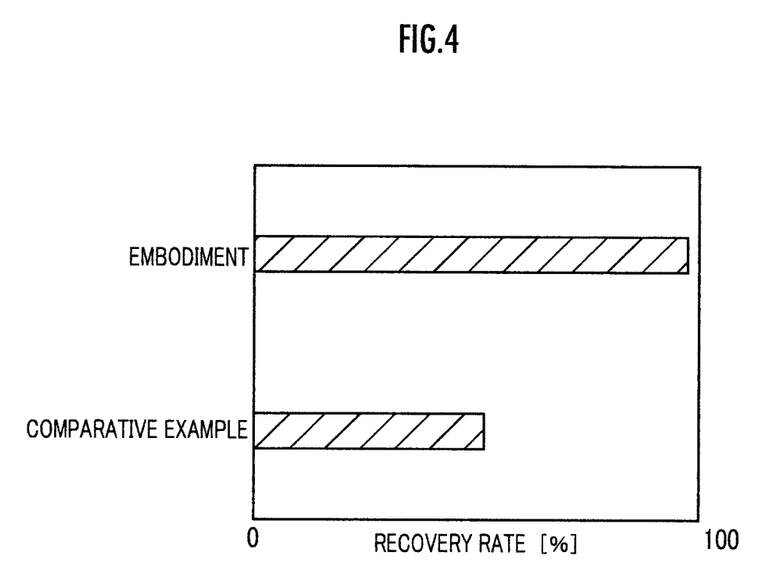
FIG. 4 An explanatory view comparing a recovery rate of separated fuel (first embodiment).

FIG. 4 shows a comparison of a recovery rate of the first fuel F1 (for example, ethanol) of the embodiment of the present invention and a comparative example. The recovery rate corresponds to the utilization rate, and means a ratio of a remaining amount of an amount of decrease of the first fuel F1 contained in the raw fuel F0 subtracted by an amount of loss of the first fuel F1 emitted to the outside air or the like, to the amount of decrease of the first fuel F1 contained in the raw fuel F0.

The embodiment is a result of repeating the above control. The comparative example is a result of supplying the evaporation fuel V to the canister 50 (and not the first fuel tank 40) from the condenser 30 by the operation of the vacuum pump 36 and successively operating the vacuum pump 36 without stopping it.

As it is clear from FIG. 4, the recovery rate of the first fuel F1 in the embodiment is higher than that of the comparative example. This means that the loss of evaporation fuel V derived from the first fuel F1 is less and that the first fuel F1 is effectively recovered or used.

The evaporation fuel V may be supplied to the condenser 30 from the first fuel tank 40 through the first collecting path and the secondary collecting path when the second opening-closing mechanism 32 is in the opened state by abbreviating the first evaporation fuel path and the third opening-closing mechanism 33. By this, it is able to raise the pressure of the condenser 30 and also to supply the first fuel F1 to the first fuel tank 40 from the condenser 30 through the same path.

Second Embodiment

Configuration

Figure 5:
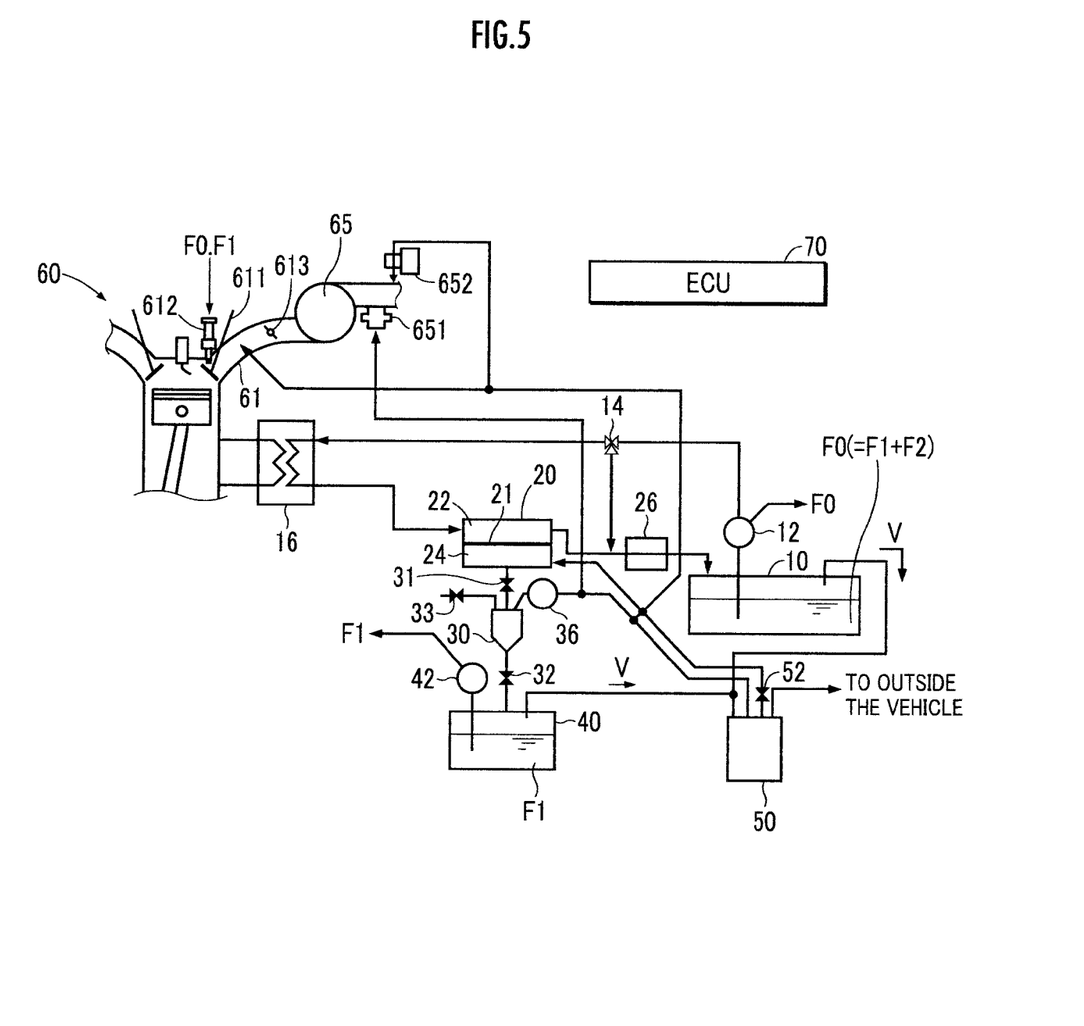
FIG. 5 An explanatory view showing features of a fuel supply system according to a second embodiment of the present invention.

The fuel supply system in the second embodiment of the present invention as shown in FIG. 5, has the same basic features as the fuel supply system in the first embodiment of the present invention shown in FIG. 1. Therefore, the common features are indicated by the same reference numerals and the explanation thereof is abbreviated.

The first evaporation fuel path provided with the third opening-closing mechanism 33 is configured to connect the condenser 30 to the canister 50 and not to the first fuel tank 40. By opening the third opening-closing mechanism 33, the evaporation fuel V adsorbed in the canister 50 is introduced to the condenser 30.

Here, it may be configured that a path connecting the condenser 30 and the outside air is provided, and the third opening-closing mechanism 33 is provided in this path, and the outside air is introduced to the condenser by opening the third opening-closing mechanism 33. Moreover, it may be configured that a path connecting the condenser 30 and the first fuel tank 40 is provided separately from the secondary collecting path, and the third opening-closing mechanism 33 is provided in this path, and the evaporation fuel V is introduced to the condenser by opening the third opening-closing mechanism 33.

The second evaporation fuel path provided with a vacuum pump 36, is configured to connect the condenser 30 to the canister 50 and not to the first fuel tank 40. The evaporation fuel V vacuumed from the condenser 30 by the operation of the vacuum pump 36 is directly supplied to the intake pipe 61 at the downstream of the throttle valve 613 from the discharge side of the vacuum pump 36. Here, the evaporation fuel V may be directly supplied to the intake pipe 61 of the internal combustion engine 60 from the first fuel tank 40.

The fifth opening-closing mechanism 35 is abbreviated in the connection path connecting the first fuel tank 40 and the canister 50.

(Functions)

The functions of the fuel supply system having the aforementioned configuration will be explained. In particular, the negative pressure control processing according to the steps explained below is repeatedly performed by the controller 70.

Figure 6:
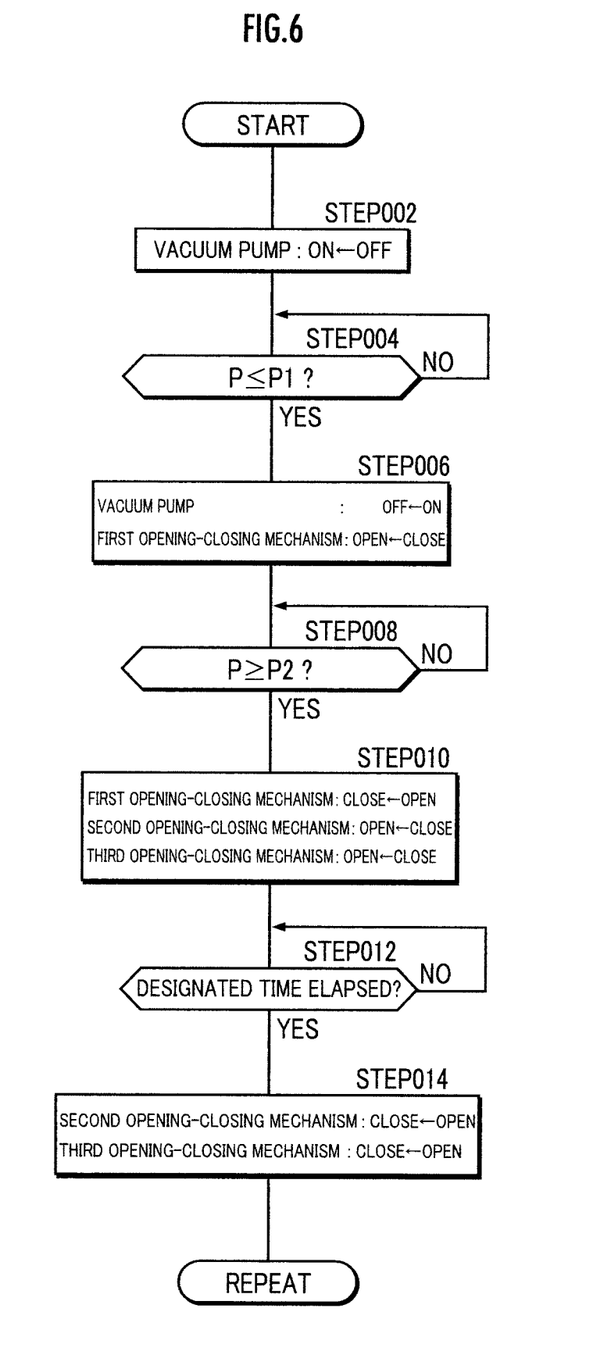
FIG. 6 A flow chart showing the steps of negative pressure control process (second embodiment).

First, the operation of the vacuum pump 36 is started in the first state of the condenser 30 (a closed state (the first opening-closing mechanism 31 . . . closed, the second opening-closing mechanism 32 . . . closed, the third opening-closing mechanism 33 . . . closed)) (FIG. 6/STEP 002).

Figure 7A:
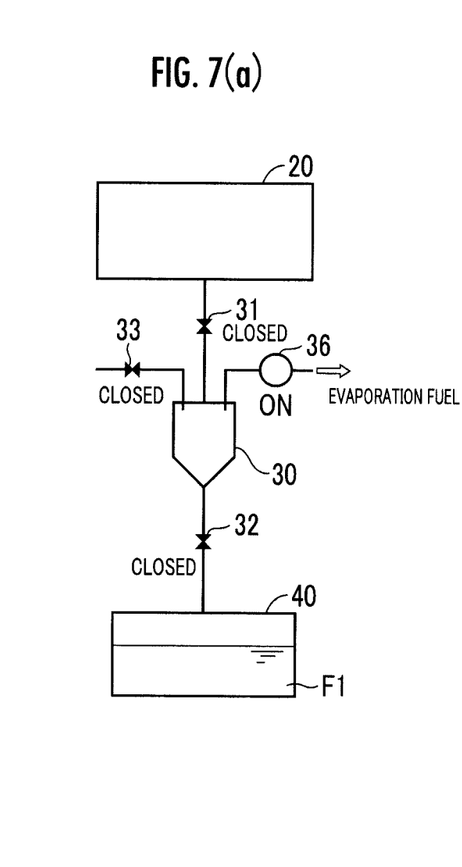
FIG. 7 An explanatory view regarding an opening-closing process of a negative pressure control system (second embodiment).

By this, as shown in FIG. 7(a), the evaporation fuel (V gas) is discharged from the condenser 30 (refer to the arrow), and the condenser 30 is depressurized. The evaporation fuel V is supplied to the canister 50 or the like.

It is determined whether or not a pressure P of the condenser 30 has reached equal to or less than a first negative pressure P1 (FIG. 6/STEP 004). Negative pressure is defined as a negative value in reference to an atmospheric pressure. That is, the absolute value thereof becomes larger as it is lower in pressure compared to the atmospheric pressure.

In a case where the above determination result is positive (FIG. 6/STEP 004 . . . YES), the operation of the vacuum pump 36 is stopped and also the first opening-closing mechanism 31 is opened (FIG. 6/STEP 006). Here, the operation of the vacuum pump 36 may be stopped and the first opening-closing mechanism 31 may be opened after a first designated time has elapsed (refer to FIG. 6/STEP 006) from starting the operation of the vacuum pump 36 (refer to FIG. 6/STEP 002).

Figure 7B:
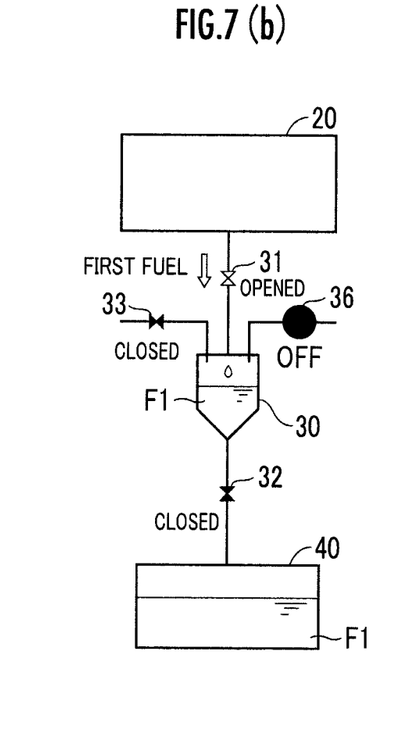

By this, the separation of the first fuel F1 and the second fuel F2 by the separation device 20 is started, in a state where the first opening-closing mechanism 31 is opened while the second opening-closing mechanism 32 and the third opening-closing mechanism 33 are closed (hereinafter referred to as a second state). As shown in FIG. 7(b), the first fuel F1 is supplied to the condenser 30 from the separation device 20. At least a part of the first fuel F1 is retained in the condenser 30 which is in a negative pressure and a coolant state, after being condensed (being phase transit from the gas phase to the liquid phase). Moreover, by stopping the vacuum pump 36, the evaporation fuel V is increased in the condenser 30 and the pressure of the condenser 30 is raised.

It is determined whether or not the pressure P of the condenser 30 has reached to be equal to or higher than a second negative pressure P2 which is higher than the first negative pressure P1 (FIG. 6/STEP 008). As mentioned before, since the negative pressure is defined as a negative value with reference to the atmospheric pressure, the absolute value of the second negative pressure P2 is smaller than the absolute value of the first negative pressure P1.

In a case where the above determination result is positive (FIG. 6/STEP 008 . . . YES), the first opening-closing mechanism 31 is closed while the second opening-closing mechanism 32 and the third opening-closing mechanism 33 are opened (FIG. 6/STEP 010). Here, the first opening-closing mechanism 31 may be closed while the second opening-closing mechanism 32 and the third opening-closing mechanism 33 are opened after a second designated time has elapsed from stopping the operation of the vacuum pump 36 and opening the first opening-closing mechanism 31 (refer to FIG. 6/STEP 010).

The values of each of the first negative pressure P1 and the second negative pressure P2 may be changed to various values in advance or may be changed by the controller 70 according to the fuel supply system or the travelling condition (acceleration request or the like) of the vehicle mounted with the fuel supply system. For example, the concentration or the containing amount of the first fuel F1 in the raw fuel F0 stored in the raw fuel tank 10 may be measured, and the second negative pressure P2 may be set higher as the measured value is higher.

Figure 7C:
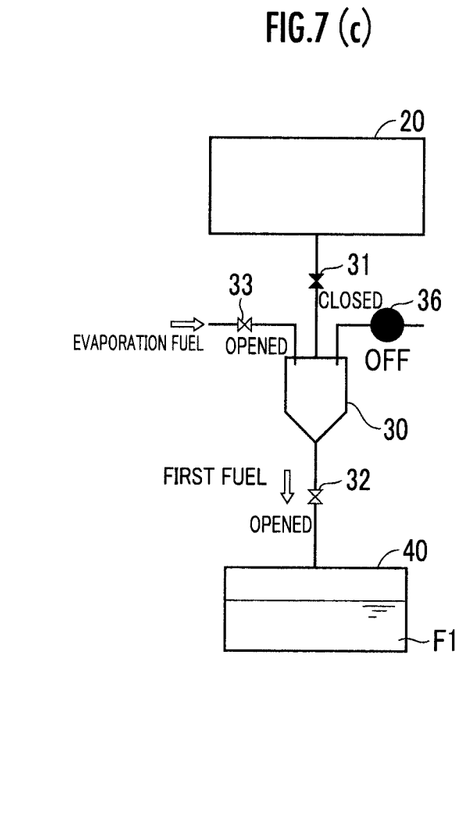

By closing the first opening-closing mechanism 31, the separation of the first fuel F1 and the second fuel F2 by the separation device 20 is stopped. By opening the second opening-closing mechanism 32, as shown in FIG. 7(c), the first fuel F1 retained in the condenser 30 is supplied to the first fuel tank 40. By opening the third opening-closing mechanism 33, as shown in FIG. 7(c), evaporation fuel V is supplied to the condenser 30 from the canister 50, and the pressure of the condenser 30 is raised and equals to the pressure of the first fuel tank 40.

It is determined whether or not a designated time (for example, 10 [s]) has elapsed after the state in which the first opening-closing mechanism 31 is closed while the second opening-closing mechanism 32 and the third opening-closing mechanism 33 are opened (hereinafter referred to as the third state) is realized (FIG. 6/STEP 012). In a case where this determination result is positive (FIG. 6/STEP 012 . . . YES), both of the second opening-closing mechanism 32 and the third opening-closing mechanism 33 are closed (FIG. 6/STEP 014). By this, after realizing the first state again, the process after the operation starting of the vacuum pump 36 is repeated again (refer to FIG. 6/STEP 002).

(Effect)

According to the second embodiment of the fuel supply system of the present invention, by operating the vacuum pump 36 in the first state, the evaporation fuel V derived from the first fuel F1 is supplied to the canister 50 (refer to FIG. 6/STEP 002, FIG. 7(a)). The evaporation fuel V is adsorbed to the adsorbent material embedded in the canister 50, and then desorbed from the adsorbent material, and supplied to the internal combustion engine 60 from the canister 50.

Thereafter, when the second state is realized, the condenser 30 and the low pressure chamber 24 of the separation device 20 communicating thereto become a negative pressure state. Therefore, the raw fuel F0 supplied from the raw fuel tank 10 to the high pressure chamber 22 of the separation device 20 is separated into the first fuel F1 and the second fuel F2 according to PV method (refer to FIG. 6/STEP 006, FIG. 7(b)). The first fuel F1 is supplied to the condenser 30 from the separation device 20 in a gas phase state, at least a part of it transiting to a liquid phase state by being condensed in the condenser 30 and is retained in the condenser 30.

Furthermore, in the third state, the first fuel F1 is supplied to the first fuel tank 40 from the condenser 30 (refer to FIG. 6/STEP 010, FIG. 7(c)).

In the second state (refer to FIG. 7(b)) and the third state (refer to FIG. 7(c)), the operation of the vacuum pump 36 is stopped.

As described above, since the operation of the vacuum pump 36 is controlled so as to repeat an intermittent operation, unlike in a case where the vacuum pump 36 is operated constantly or continuously, the situation in which the supply amount of the evaporation fuel V to the canister 50 becomes excess can be avoided or restrained. As a result, the amount of evaporation fuel V discharged outside the vehicle or the like from the canister 50 in a non-recoverable form without being supplied to the internal combustion engine 60 is reduced, and the utilization rate thereof can be improved.

Moreover, the evaporation fuel V is supplied to the condenser 30 from the canister 50 through the third opening-closing mechanism 33 which is in an opened state (refer to FIG. 7(c)). By this, when the third opening-closing mechanism 33 transits from the closed state to the opened state, a situation in which the evaporation fuel V existing in the condenser 30 is discharged to outside of the vehicle or the like and wasted is avoided. Moreover, the utilization rate of the evaporation fuel V supplied to the canister 50 from the first fuel tank 40 is improved.

The evaporation fuel V desorbed from the canister 50 is supplied to the low pressure chamber 24 of the separation device 20 (refer to FIG. 5). Therefore, in stead of making the condenser 30 and the first fuel tank 40 to be the same pressure, by making the low pressure chamber 24 of the separation device 20 and the condenser 30 the same pressure, the liquid drop of the first fuel F1 after separation in the low pressure chamber 24 is discharged to the condenser 30 or the first fuel tank 40. Therefore, the performance of the separation device 20 is increased.

Moreover, the canister 50 is heated by the condensation heat of the first fuel F1 generated at the condenser 30. By this heating, since the desorption of the evaporation fuel V from the canister 50 is prompted and it can be supplied to the internal combustion engine 60, the utilization rate of the evaporation fuel V is improved.

Figure 8:
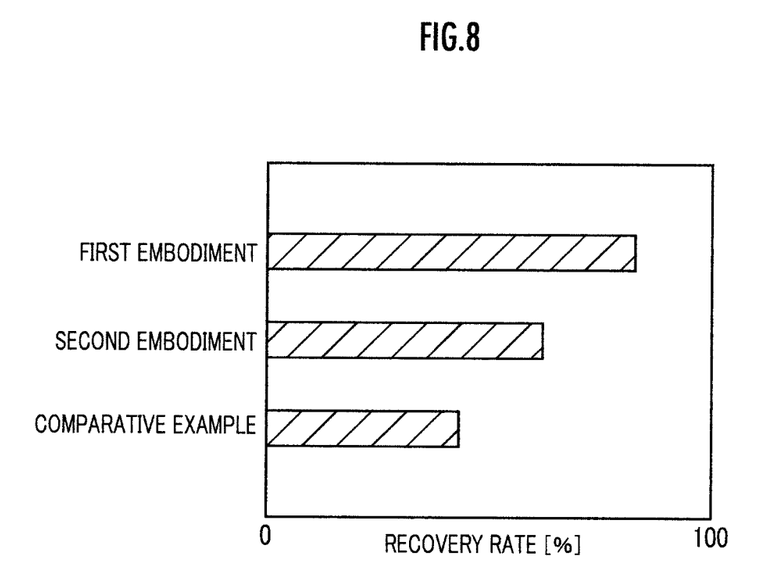
FIG. 8 An explanatory view comparing a recovery rate of separated fuel (second embodiment).

FIG. 8 shows a comparison of a recovery rate of the first fuel F1 (for example, ethanol) of the embodiment of the present invention and a comparative example. The recovery rate corresponds to the utilization rate, and means a ratio of a remaining amount of an amount of decrease of the first fuel F1 contained in the raw fuel F0 subtracted by an amount of loss of the first fuel F1 to the outside air by emission, to the amount of decrease of the first fuel F1 contained in the raw fuel F0.

The first embodiment and the second embodiment is a result of repeating the negative pressure control. The comparative example is a result of operating the vacuum pump 36 successively without stopping it. Compared to the second embodiment, the first embodiment is set to have a larger difference between the first negative pressure P1 and the second negative pressure P2, and accordingly, the negative pressure control period is relatively long.

As it is clear from FIG. 8, the recovery rate of the first fuel F1 in the first embodiment and the second embodiment are higher than that of the comparative example. This means that the loss of evaporation fuel V derived from the first fuel F1 is less by the execution of the negative pressure control and that the first fuel F1 is effectively recovered. Furthermore, the recovery rate of the first fuel F1 in the first embodiment is higher than that of the second embodiment. This means that the loss of evaporation fuel V derived from the first fuel F1 is reduced by changing the negative pressure control period and the recovery rate of the first fuel F1 is further improved.

In the second embodiment, for each negative pressure control period, the first state (vacuum pump operated), the second state (vacuum pump operation stopped), and the third state (vacuum pump operation stopped) are realized repeatedly in order (refer to FIG. 6 and FIG. 7). As another embodiment, for each negative pressure control period, the first state and the second state may be realized alternately for a plurality of times, and then the third state may be realized.

The evaporation fuel V may be supplied to the condenser 30 from the first fuel tank 40 through the first collecting path and the secondary collecting path when the second opening-closing mechanism 32 is in an opened state and the third opening-closing mechanism 33 is abbreviated. By this, it is able to raise the pressure of the condenser 30 and also to supply the first fuel F1 to the first fuel tank 40 from the condenser 30 through a common path.

In such case, a sequence of a state in which the first opening-closing mechanism 31 and the second opening-closing mechanism 32 are closed and a state in which one of the first opening-closing mechanism 31 and the second opening-closing mechanism 32 is opened, may be realized repeatedly by the controller 70. Furthermore, the vacuum pump 36 may be operated in the state in which the first opening-closing mechanism 31 and the second opening-closing mechanism 32 are closed while the operation of the vacuum pump 36 may be stopped in the state in which one of the first opening-closing mechanism 31 and the second opening-closing mechanism 32 is opened.

According to the fuel supply system having the above configuration, by operating the vacuum pump 36 in a state in which the first opening-closing mechanism 31 and the second opening-closing mechanism 32 are closed, the condenser 30 is made to be the negative pressure state and also the evaporation fuel V derived from the first fuel F1 is supplied to the canister (refer to FIG. 7(a)).

Thereafter, in a state in which the first opening-closing mechanism 31 is opened while the second opening-closing mechanism 32 is closed, the raw fuel F0 is separated to the first fuel F1 and the second fuel F2 by the separation device 20 (refer to FIG. 7(b)). As an alternative, thereafter, in a state in which the first opening-closing mechanism 31 is closed, while the second opening-closing mechanism 32 is opened, the first fuel F1 is supplied to the first fuel tank 40 from the condenser 30, while the evaporation fuel V is supplied to the condenser 30 from the first fuel tank 40 (refer to FIG. 7(c)).

In such an occasion, by stopping the operation of the vacuum pump 36, a situation in which the evaporation fuel V is excessively supplied to the canister 50 can be avoided. As a result, the evaporation fuel V emitted outside the vehicle from the canister 50 without being supplied to the internal combustion engine 60 is reduced thereby improving the utilization rate thereof.

EXPLANATION OF THE REFERENCE NUMERALS

10 . . . raw fuel tank, 20 . . . separation device, 21 . . . separation membrane, 30 . . . condenser, 31 . . . first opening-closing mechanism, 32 . . . second opening-closing mechanism, 33 . . . third opening-closing mechanism, 36 . . . vacuum pump, 40 . . . first fuel tank, 50 . . . canister, 60 . . . internal combustion engine, 70 . . . ECU (controller)

The invention claimed is:

1. A fuel supply system configured to supply a first fuel which is separated from a raw fuel and containing components with a higher octane number compared to the raw fuel, and the raw fuel or a second fuel which is separated from the raw fuel and containing components with a lower octane number compared to the raw fuel, selectively or by a specified mixing ratio to an internal combustion engine at the same time, comprising:
   a raw fuel tank configured to store the raw fuel;
   a separation device configured to separate the raw fuel supplied from the raw fuel tank to the first fuel and the second fuel;
   a condenser configured to condense the first fuel separated by the separation device;
   a first fuel tank configured to store the first fuel condensed by the condenser;
   a vacuum pump configured to suction an evaporation fuel generated by an evaporation of the first fuel from the condenser, and configured to provide the evaporation fuel to the first fuel tank;
   a controller configured to control an operation of the vacuum pump; and
   a pressure sensor configured to measure an internal atmospheric pressure of the condenser.

2. The fuel supply system according to claim 1, wherein the fuel supply system is configured to supply the evaporation fuel from the first fuel tank to the condenser.

3. The fuel supply system according to claim 2 further comprising:
   a first opening-closing mechanism configured to open and close a first collecting path for supplying the first fuel separated by the separation device to the condenser;
   a second opening-closing mechanism configured to open and close a secondary collecting path for supplying the first fuel which is condensed by the condenser and in a liquid phase state to the first fuel tank;
   a third opening-closing mechanism configured to open and close a first evaporation fuel path for supplying the evaporation fuel to the condenser from the first fuel tank; and
   a fourth opening-closing mechanism configured to open and close a second evaporation fuel path for supplying the evaporation fuel to the first fuel tank from the condenser and which is provided with the vacuum pump,
   wherein the controller is configured to control an operation of the first opening-closing mechanism, the second opening-closing mechanism, the third opening-closing mechanism, and the fourth opening-closing mechanism so as to realize in order a first state in which the first opening-closing mechanism is opened while the second opening-closing mechanism, the third opening-closing mechanism, and the fourth opening-closing mechanism are closed, a second state in which the second opening-closing mechanism and the third opening-closing mechanism are opened while the first opening-closing mechanism and the fourth opening-closing mechanism are closed, and a third state in which the fourth opening-closing mechanism is opened while the first opening-closing mechanism, the second opening-closing mechanism, and the third opening-closing mechanism are closed, and
   wherein the controller is configured to control the operation of the vacuum pump so as to operate the vacuum pump in the third state and to stop the operation of the vacuum pump in the first state and the second state.

4. The fuel supply system according to claim 3,
   wherein the controller is configured to control the operation of the first opening-closing mechanism, the second opening-closing mechanism, the third opening-closing mechanism, and the fourth opening-closing mechanism so as to realize a transition from the third state to the first state on a condition that the internal atmospheric pressure of the condenser represented by an output signal of the pressure sensor decreases to be equal to or lower than a first negative pressure, while so as to realize a transition from the first state to the second state on a condition that the internal atmospheric pressure of the condenser represented by the output signal of the pressure sensor increases to be equal to or higher than a second negative pressure which is higher than the first negative pressure.

5. The fuel supply system according to claim 3 further comprising a fifth
   opening-closing mechanism configured to open and close a path for supplying the evaporation fuel to the internal combustion engine from the first fuel tank,
   wherein the controller is configured to control an operation of the fifth opening-closing mechanism so as to realize a fourth state in which the fifth opening-closing mechanism is opened.

6. The fuel supply system according to claim 5 further comprising a pressure sensor configured to measure an internal atmospheric pressure of the first fuel tank,
   wherein the controller is configured to control the operation of the fifth opening-closing mechanism so as to realize the fourth state on a condition that the internal atmospheric pressure of the first fuel tank represented by an output signal of the pressure sensor increases to be equal to or higher than a threshold value.

7. The fuel supply system according to claim 1 further comprising a canister configured to adsorb the evaporation fuel generated by the evaporation of the first fuel, and to desorb the evaporation fuel so as to supply it to the internal combustion engine,
   wherein the controller is configured to control so as to suction the evaporation fuel from the condenser and to supply the suctioned evaporation fuel to the canister.

8. The fuel supply system according to claim 7 further comprising a plurality of opening-closing mechanisms configured to open and close between the condenser and an outside,
wherein the controller is configured to control the operation of each of the plurality of opening-closing mechanisms so as to realize alternately a closed state in which the condenser is intercepted from the outside and an opened state in which the condenser communicates to the outside, and to control the operation of the vacuum pump so as to operate the vacuum pump in the closed state of the condenser, while to stop the operation of the vacuum pump in the opened state of the condenser.

9. The fuel supply system according to claim 8 further comprising:
a first opening-closing mechanism configured to open and close a first collecting path for supplying the first fuel from the separation device to the condenser;
a second opening-closing mechanism configured to open and close a secondary collecting path for supplying the first fuel from the condenser to the first fuel tank; and
a third opening-closing mechanism configured to open and close a path for supplying air from outside to the condenser,
wherein the controller is configured to control an operation of the first opening-closing mechanism, the second opening-closing mechanism, and the third opening-closing mechanism so as to realize in order a first state as the closed state of the condenser in which the first opening-closing mechanism, the second opening-closing mechanism, and the third opening-closing mechanism are closed, a second state as the opened state of the condenser in which the first opening-closing mechanism is opened while the second opening-closing mechanism and the third opening-closing mechanism are closed, and a third state as the opened state of the condenser in which the first opening-closing mechanism is closed while the second opening-closing mechanism and the third opening-closing mechanism are opened.

10. The fuel supply system according to claim 9, wherein the fuel supply system is configured to supply the evaporation fuel to the condenser from the canister through the third opening-closing mechanism in the opened state.

11. The fuel supply system according to claim 10, wherein the fuel supply system is configured to supply the evaporation fuel to the canister from the first fuel tank.

12. The fuel supply system according to claim 11, wherein the fuel supply system is configured to supply the evaporation fuel desorbed from the canister to the separation device.

13. The fuel supply system according to claim 12, wherein the fuel supply system is configured that the canister is heated by a condensation heat of the first fuel generated at the condenser.

14. The fuel supply system according to claim 9,
wherein the controller is configured to control the operation of the first opening-closing mechanism, the second opening-closing mechanism, and the third opening-closing mechanism, so as to realize a transition from the first state to the second state on a condition that the internal atmospheric pressure of the condenser represented by an output signal of the pressure sensor decreases to be equal to or lower than a first negative pressure, while so as to realize a transition from the second state to the third state on a condition that the internal atmospheric pressure of the condenser represented by the output signal of the pressure sensor increases to be equal to or higher than a second negative pressure which is higher than the first negative pressure.

15. The fuel supply system according to claim 14, wherein the fuel supply system is configured to supply the evaporation fuel desorbed from the canister to the separation device.

16. The fuel supply system according to claim 15, wherein the fuel supply system is configured that the canister is heated by a condensation heat of the first fuel generated at the condenser.

* * * * *